(12) United States Patent  (10) Patent No.: US 7,614,687 B2
Nakamura et al.  (45) Date of Patent: Nov. 10, 2009

(54) PILLAR CONSTRUCTION FOR VEHICLE

(75) Inventors: Takuo Nakamura, Okazaki (JP);
Hayami Nakagawa, Anjo (JP); Junichi Yanase, Nagoya (JP); Hiroyuki Seino, Okazaki (JP); Hideki Ito, Okazaki (JP); Koji Fujii, Okazaki (JP); Setoshi Yanagimoto, Susono (JP); Masato Onodera, Toyohashi (JP); Fumiya Amano, Toyohashi (JP)

(73) Assignees: Mitsubishi Jidosha Kogyo Kabushiki Kaisha, Tokyo (JP); Ahresty Corporation, Tokyo (JP)

( * ) Notice: Subject to any disclaimer, the term of this patent is extended or adjusted under 35 U.S.C. 154(b) by 0 days.

(21) Appl. No.: 12/055,044

(22) Filed: Mar. 25, 2008

(65) Prior Publication Data

US 2008/0238151 A1 Oct. 2, 2008

(30) Foreign Application Priority Data

Mar. 30, 2007 (JP) .......................... P2007-094601

(51) Int. Cl.
*B60N 99/00* (2006.01)
(52) U.S. Cl. .............................. 296/193.06; 296/193.05
(58) Field of Classification Search ............ 296/193.05, 296/193.06
See application file for complete search history.

(56) References Cited

U.S. PATENT DOCUMENTS

| 5,382,071 A | * | 1/1995 | Enning et al. | 296/203.03 |
| 2005/0189790 A1 | * | 9/2005 | Chernoff et al. | 296/193.05 |
| 2006/0208537 A1 | * | 9/2006 | Dingman et al. | 296/193.05 |

FOREIGN PATENT DOCUMENTS

JP 2003-261072 A 9/2003

* cited by examiner

*Primary Examiner*—Lori L Lyjak
(74) *Attorney, Agent, or Firm*—Birch, Stewart, Kolasch & Birch, LLP

(57) ABSTRACT

An upper member of a pillar has a substantially U-shaped cross section, and includes first side walls extending substantially in a transverse direction of the vehicle at least at a lower portion, and a connecting plate at a lower end while keeping the U-shaped cross section. A lower member includes a mounting plate opposed to the connecting plate at a lower portion being lower than an upper end, and second side walls extending substantially in the transverse direction at both end portions of the mounting plate in a longitudinal direction of the vehicle. The connecting plate and the mounting plate are welded to each other in a state that they are in abutment with each other, and the first side walls and the second side walls are joined to each other, and the upper member and the lower member are integrally fixed to each other.

3 Claims, 10 Drawing Sheets

PILLAR CONSTRUCTION FOR VEHICLE

BACKGROUND OF THE INVENTION

1. Field of the Invention

The present invention relates to a pillar construction for a vehicle which is made of a diecast aluminum alloy.

2. Description of the Related Art

In reducing the weight of a vehicle, it is considered to form members which make up a body of the vehicle using an aluminum alloy. In addition, when the body is made of aluminum alloy, it is considered to use a diecast aluminum alloy for a particular member which requires strength such as a C pillar (a rear pillar).

On the other hand, the C pillar lies in the vicinity of a rear axle of the vehicle and is a member which is formed into a vertically long and complex shape in such a way that an upper portion is connected to a side roof rail and a lower portion extends as down as a rear suspension cross-member or a side sill. Due to this, in forming a C pillar of diecast aluminum alloy, it is considered that a C pillar is divided into an upper member and a lower member in the vicinity of substantially a vertical center of the C pillar, for example, in a position which corresponds to the vicinity of an upper edge of a rear wheel house, the upper member and the lower member, which are so divided, are formed of diecast aluminum alloy, and thereafter, the upper and lower members are joined integrally to each other (for example, refer to JP-A-2003-261072).

However, with such a construction in which the C pillar is divided into the upper member and the lower member, and the upper member and the lower member are joined together just by welding along the parting line which divides the C pillar in the way as described above, there has still remained a problem that the joined portion becomes rectilinear, and strength, in particular, rigidity with respect to the transverse direction of the vehicle or rigidity with respect to torsion cannot be obtained sufficiently. In addition, aligning the joining portions is not easy, and when fitting portions formed respectively on the upper member and the lower member are brought into abutment with each other to thereby be joined together, there has been caused a problem that variation in shape, which is produced when the upper and lower members are manufactured, is unable to be absorbed.

In addition, in joining the C pillar to the side roof rail, and the side roof rail to the roof bow, while the end portion of the C pillar and the end portion of the roof bow are formed flat for the C pillar and the roof bow to be fixed onto the side roof rail, bending easily appears at the flat portions, and in order to secure required rigidity, the plate thickness needs to be increased, this leading to an increase in the number of labor hours.

SUMMARY OF THE INVENTION

An object of the invention is to provide a vehicle pillar which provides high rigidity and moreover, even though the vehicle pillar is formed by joining an upper member and a lower member, facilitates the alignment of the upper member with the lower member at the time of joining them together.

In order to achieve the object, according to the invention, there is provided a pillar construction for a vehicle, comprising:

a pillar which is a part of a body of the vehicle, the pillar including an upper member and a lower member made of diecast aluminum alloy, wherein the upper member has a substantially U-shaped cross section, and includes first side walls extending substantially in a transverse direction of the vehicle at least at a lower portion thereof, and the upper member further includes a connecting plate at a lower end thereof while keeping the U-shaped cross section, the lower member includes a mounting plate, opposed to the connecting plate, at a lower portion thereof which is lower than an upper end thereof, and the lower member includes second side walls at both end portions of the mounting plate in a longitudinal direction of the vehicle, the second side walls extend substantially in the transverse direction of the vehicle, and the connecting plate and the mounting plate are welded to each other in a state that the connecting plate and the mounting plate are in abutment with each other, and the first side walls and the second side walls or the first and second side walls and wall members attached to the first and second side walls, are coined to each other, and the upper member and the lower member are integrally fixed to each other.

The pillar may include a C pillar in which an upper end of the upper member is attached to the side roof rail. The lower portion of the lower member may be attached to a side sill.

The upper end may be provided with a depression. An end portion of a roof bow having an angularly annular cross section may be fitted to the depression. The end portion of the roof bow may be fixed into the depression.

DETAILED DESCRIPTION OF THE PRESENT INVENTION

Figure 1:
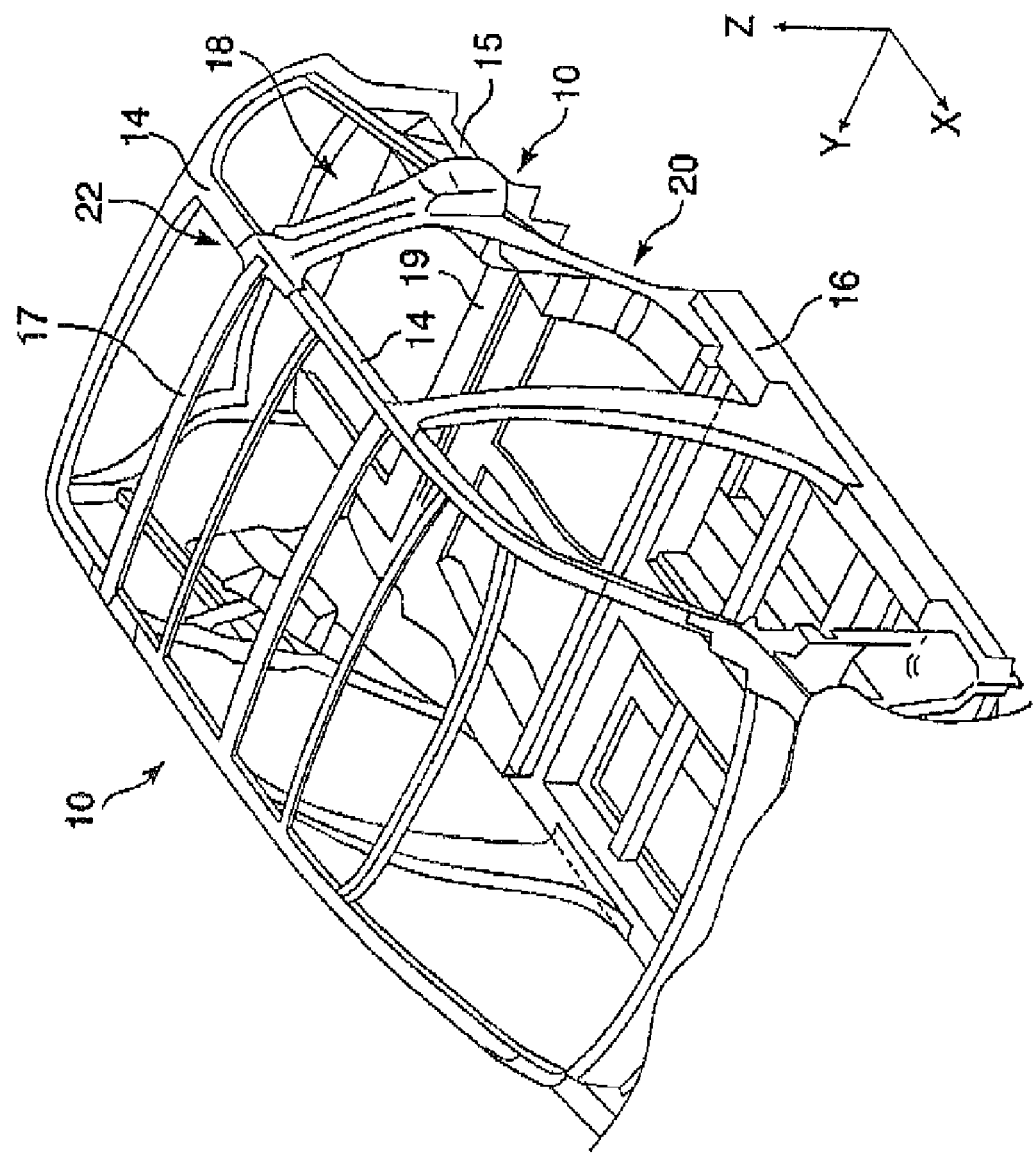
FIG. 1 is a view showing an embodiment of a pillar construction of a body according to the invention.

An embodiment of a vehicle pillar construction according to the invention will be described with reference to the drawings by taking a C pillar for example. FIG. 1 shows part of a body framework construction of a motor vehicle (a vehicle) which includes C pillars. In the following description, note that front (front side), rear (rear side) and left to right width or transverse directions are defined based on a traveling direction of a motor vehicle, and a direction which is directed towards a transverse center of the motor vehicle is defined as an inward direction (inside) whereas a direction expanding from the center of the motor vehicle towards the transverse direction as an outward direction (outside). In addition, a direction in which gravity acts is defined as a downward direction (lower side), and a direction opposite to the direction in which gravity acts as an upward direction (upper side). In the figures, arrows X, Y and Z denote three directions which are at right angles to one another, the arrow X denoting the front of a body, the arrow Y denoting a left-hand side of the body as viewed in the transverse direction, the arrow Z denoting the upward direction of the body. In addition, in the following description, transversely symmetrical configurations will not fully be described but will be described only on either of a plurality of constituent members or components as required.

A C pillar 10 is a structural member which is disposed in the vicinity of a rear wheel of a vehicle and is connected to a side roof rail 14 at an upper portion thereof and to a rear side member 15 and a side sill 16 at a lower portion thereof. The C pillar 10 is provided in pair on left- and right-hand sides of the vehicle, and between the left and right C pillars 10, a roof bow 17 is mounted in an upper portion, while a rear cross-member 19 is provided in a lower portion.

Figure 2:
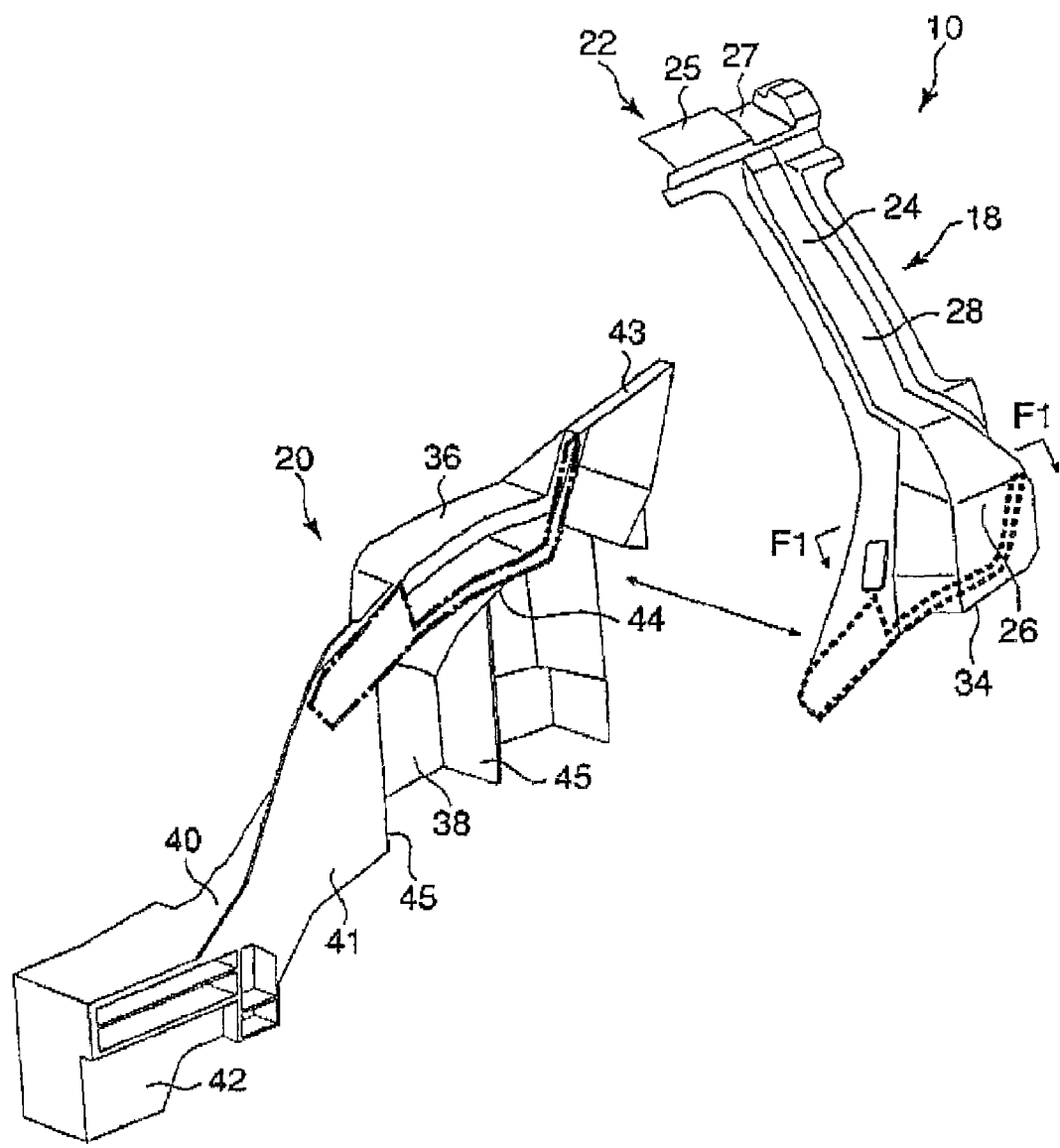
FIG. 2 is an exploded perspective view showing a C pillar.

As is shown in FIG. 2, the C pillar 10 is made up of an upper member 18 and a lower member 20. The upper member 18 is a member extending from an upper end of the C pillar 10 down to the vicinity of substantially a center of the height of the C pillar 10, while the lower member 20 is a member extending from the vicinity of substantially the center of the height of the C pillar 10 to a lower end of the C pillar 10. Either of the upper member 18 and the lower member 20 is formed by means of, for example, diecast.

The upper member 18 has a T-shaped mounting portion 22 in the upper portion, and a pillar-like support portion 24 extends downwards from the mounting portion 22, a proximal mounting portion 26 being provided in a lower portion of the support portion 24. The mounting portion 22 has an upper plate 25 which extends substantially horizontally in such a manner as to be hooked on an upper surface of the side roof rail 14, and a depression 27, matching a cross section of the roof bow 17, is formed in a center of the upper plate 25. The support portion 24 is formed substantially into a straight line, and a projecting portion 28 having a U-shaped cross section is formed transversely centrally of the support portion 24 in such a manner as to extend along a longitudinal direction of the support portion 24.

Figure 3:
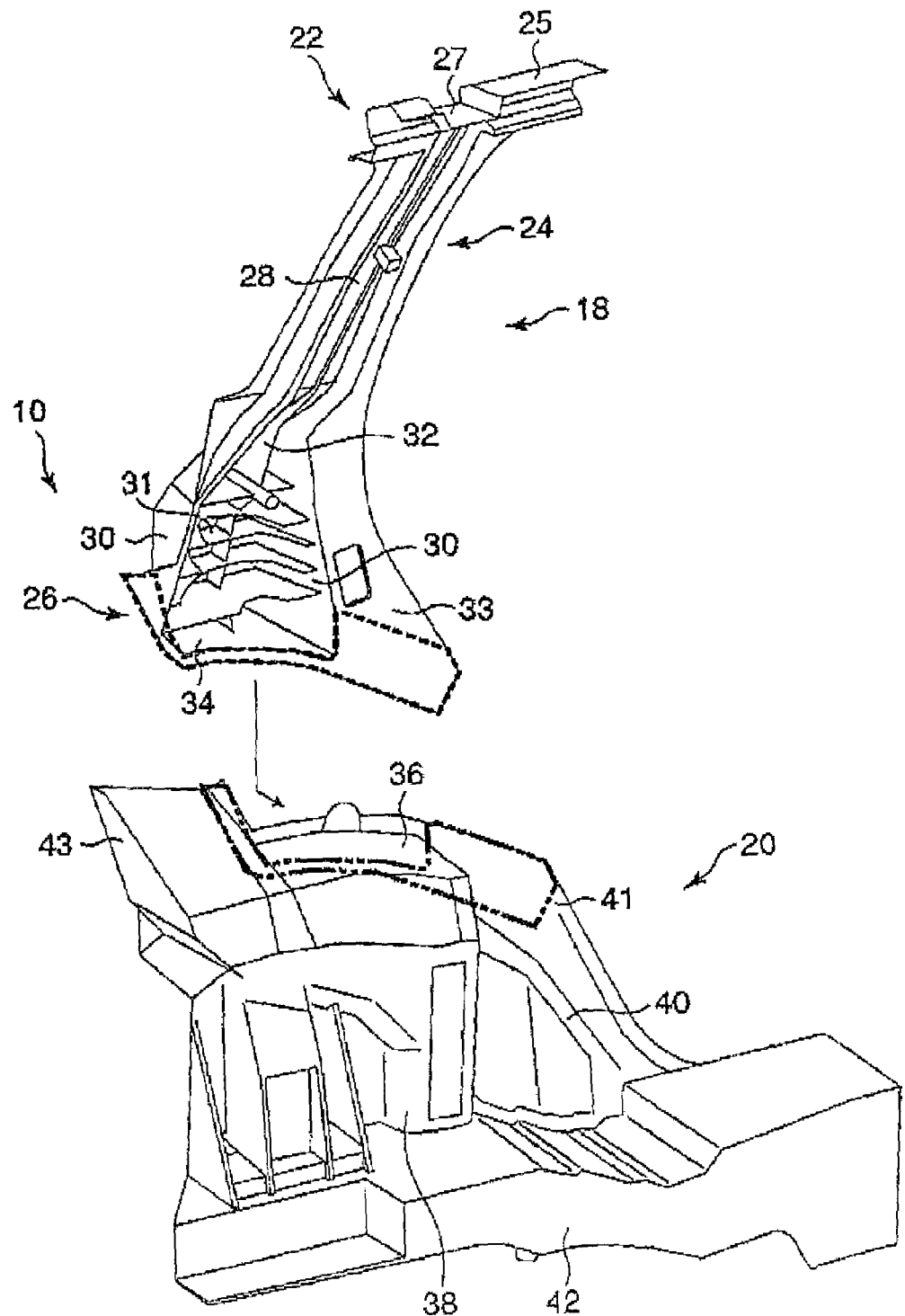
FIG. 3 is an exploded perspective view showing the C pillar.
Figure 6:
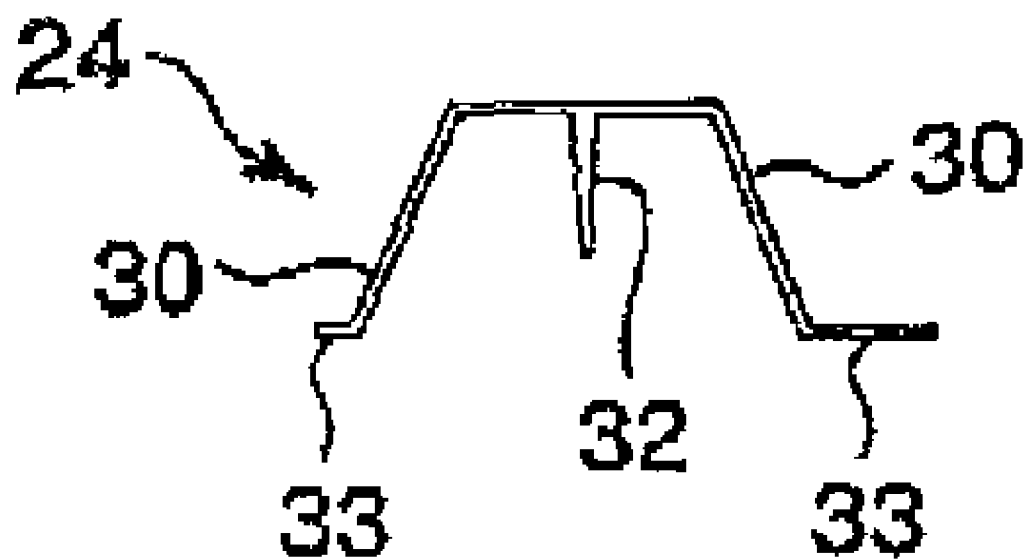
FIG. 6 is a cross-sectional view showing the C pillar.

The proximal mounting portion 26 is formed into a shape which expands continuously downwards into a triangular shape from the support portion 24 and furthermore, is curved largely in such a manner as to project outwards (outwards of L the vehicle. This is true in the following description.). The proximal mounting portion 26 is formed substantially into a U-shape in cross section which has left and right side walls 30, as is shown in FIG. 6, when a cross section is viewed which is taken along a substantially horizontal plane from a position denoted by F1 in the figure, or, to be exact, taken along a plane perpendicular to the longitudinal direction of the upper member 18. In addition, a rib 32, which continues from the support portion 24, is provided centrally within the proximal mounting portion 26 in such a manner as to extend along the longitudinal direction. FIG. 3 shows the C pillar 10 with the upper portion 18 shown as seen from a back side thereof or an opposite direction to FIG. 2, in which the upper portion shown as seen from a front side thereof.

As is shown in FIG. 3, flanges 33 are further provided on the proximal mounting portion 26 in such manner as to lie on both sides of the side walls 30, and ribs 31 are formed inside the proximal mounting portion 26 in such a manner as to extend substantially horizontally, a connecting plate 34 being formed at the lower end of the proximal mounting portion 26 so as to be joined to the lower member 20.

The lower member 20 corresponds substantially to a front-half portion of a rear wheel house of the vehicle and is made up of a top plate 36 which is situated in the upper portion of the lower member 20, a side plate 38 attached to an inner edge of the top plate 36, a sloping member 40 which extends downwards from a front end portion of the top plate 36 and a side extension member 42 which extends rearwards from a lower end of the sloping member 40.

A proximal member 43 for mounting a rear suspension is provided at the rear of the top plate 36, and as is shown in FIG. 2, a mounting plate 44, extending in parallel to the top plate 36, is provided below the top plate 36 in such a manner as to extend from the side plate 38. Furthermore, side walls 45 are provided vertically, respectively, at the front and rear end portions of the top plate 36 in such a manner as to extend downwards by passing through end portions of the mounting plate 44. Outward edges of the top plate 36 and the mounting plate 44 are formed in such a manner as to be situated substantially on the same plane. Furthermore, the outward edge of the mounting plate 44 is formed in such a manner as to be brought into abutment with an edge of the connecting plate 34.

A flange 41 is formed on an outward edge of the sloping member 40 in such a manner as to extend along the sloping member 40. The flange 41 is formed in such a manner as to lie on the same plane as the mounting plate 44 and to continue to the mounting plate 44, and a front edge of the proximal member 43 is also formed in such a manner as to lie on the same plane as the mounting plate 44 and to continue to the mounting plate 44. A leading end of the sloping member 40 is connected to a rear end of the side sill 16, and a front end of the rear side member 15 is connected to the rear of the side extension member 42.

The C pillar 10 is made up by joining together the upper member 18 and the lower member 20 by means of welding. As is shown in FIGS. 2 and 3, joining of the lower member 18 to the upper member 20 is implemented by butting the lower portion of the upper member 18 up against the upper portion of the lower member 20 and welding them together along a line indicated by a dotted line and a chain double-dashed line. The doffed line and the chain double-dashed line, which are shown as the welding line, respectively show contours on the upper member 18 and the lower member 20 which are formed into matching shapes. Namely, the welding line on the upper member 18 extends on portions on the connecting plate 34 and the flanges 33 which continue to the connecting plate 34 as is indicated by the dotted line, while on the lower member 20, the welding line extends on the mounting plate 44, the flange 41 which continues to the mounting plate 44 and part of the proximal member 43 as is indicated by the chain double-dashed line.

Figure 4:
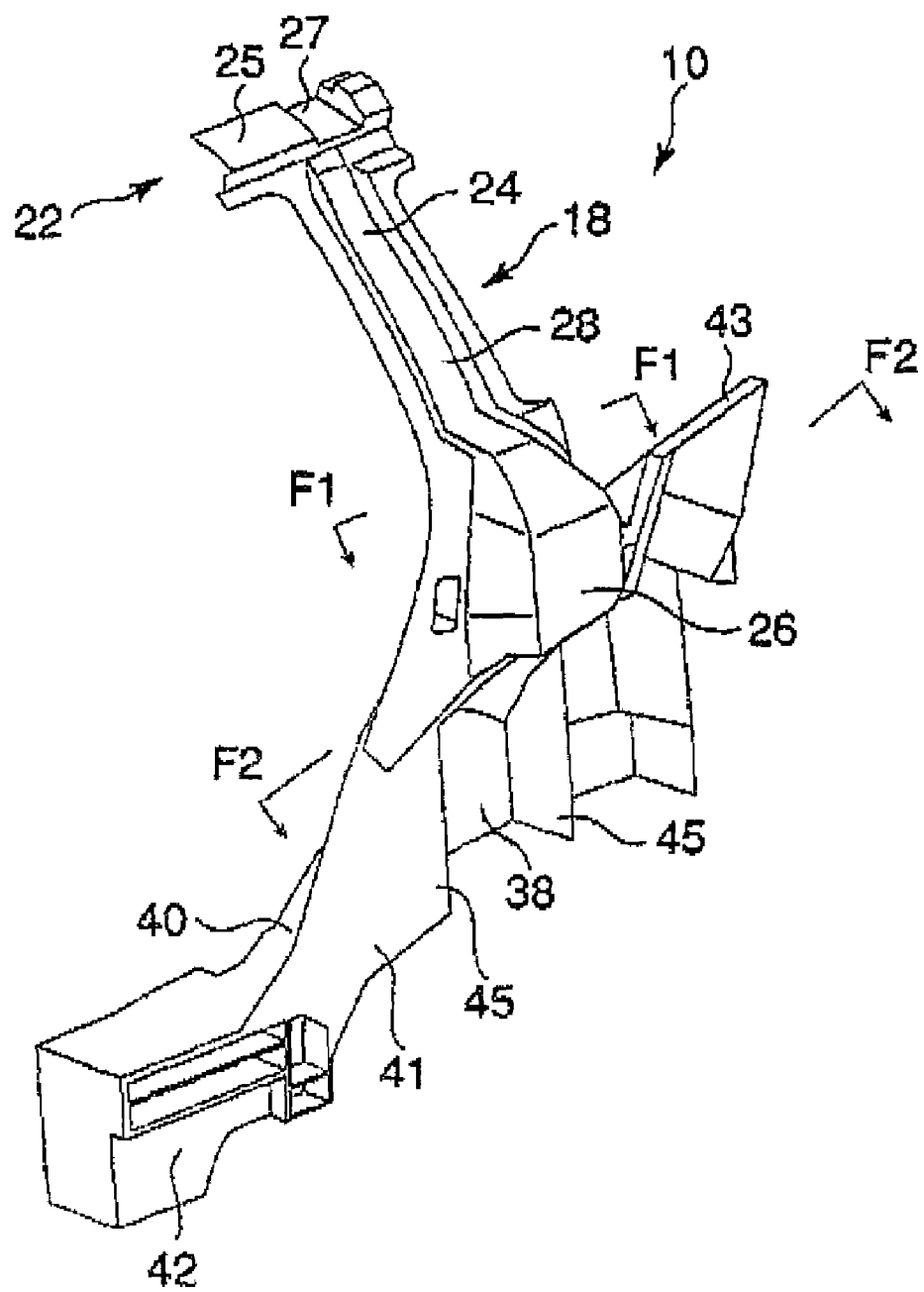
FIG. 4 is a perspective view showing the C pillar.
Figure 5:
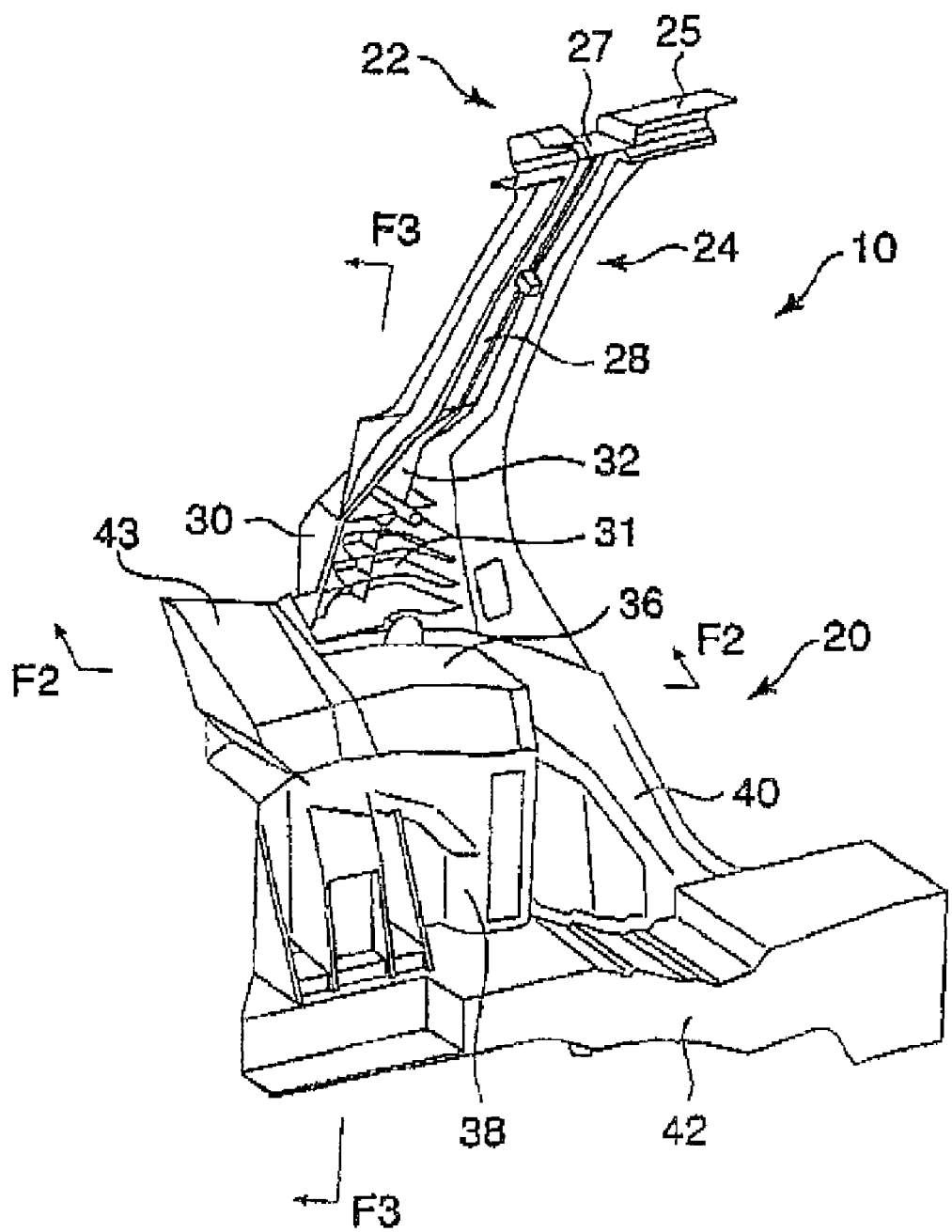
FIG. 5 is a perspective view showing the C pillar.
Figure 7:
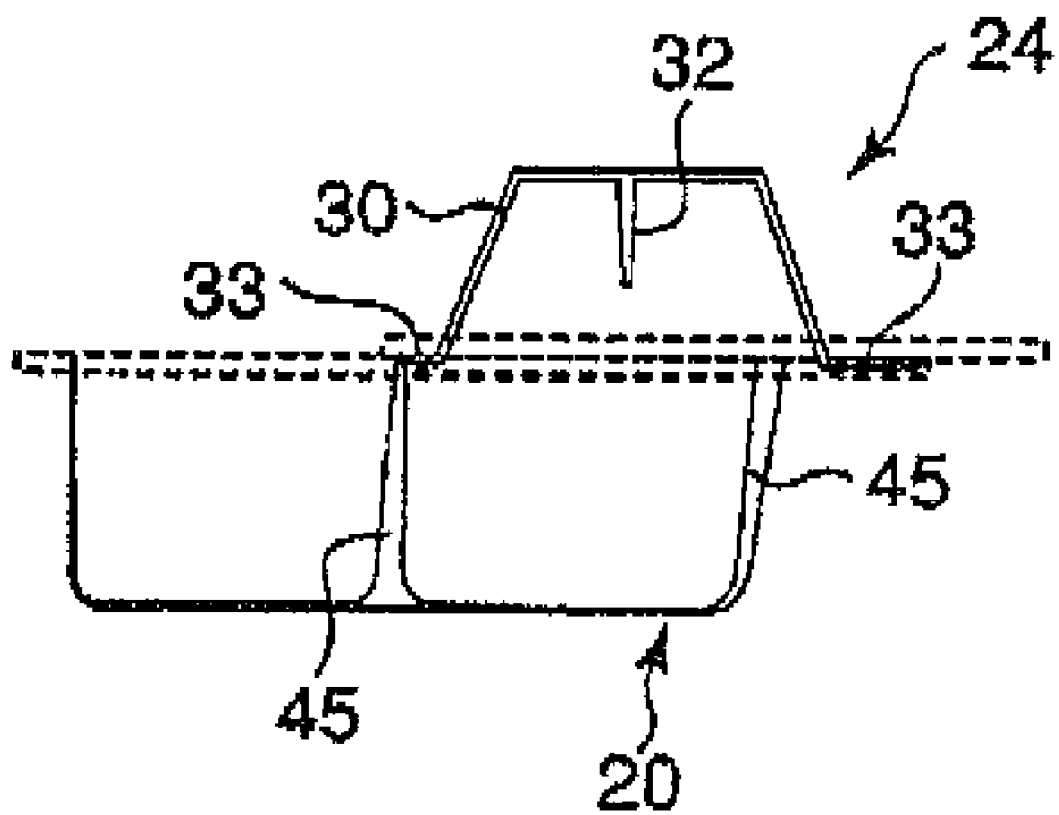
FIG. 7 is a cross-sectional view showing the C pillar.
Figure 8:
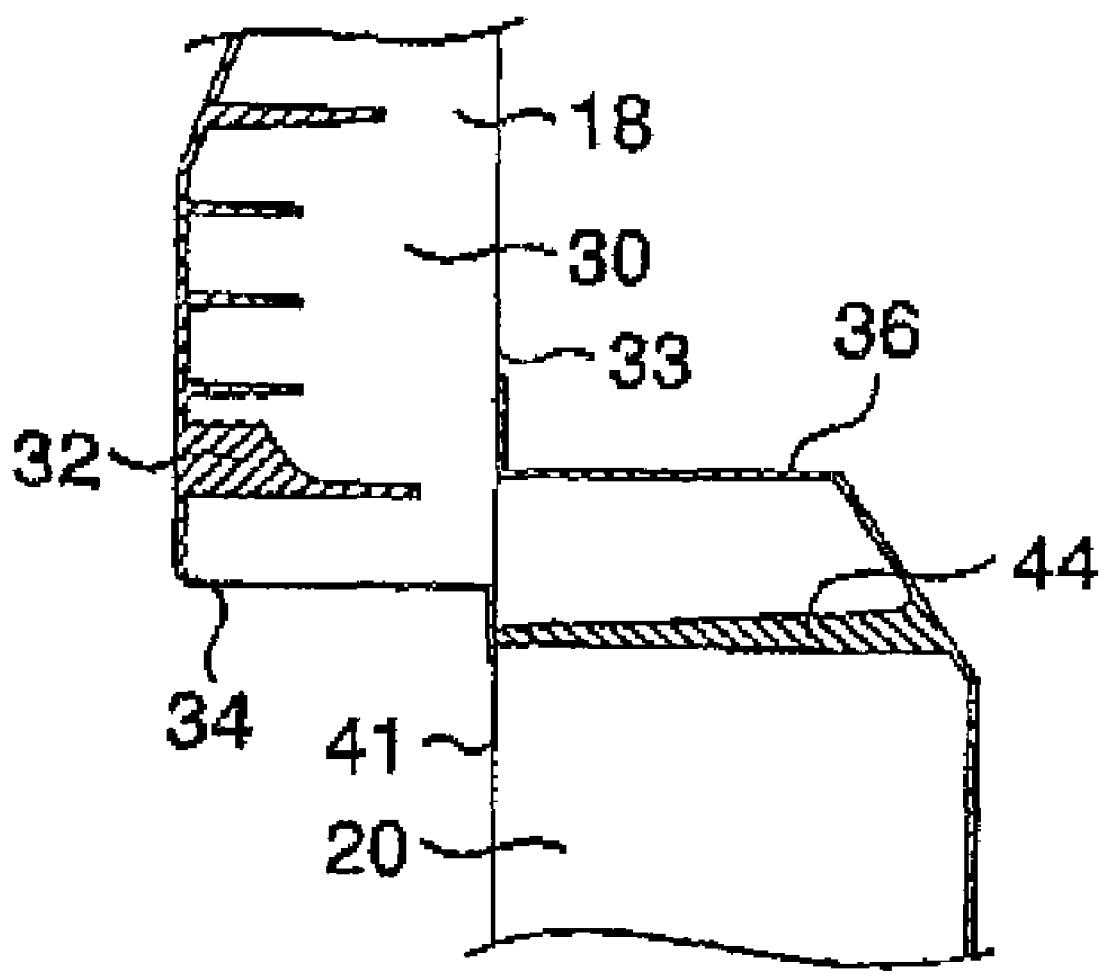
FIG. 8 is a vertical sectional view showing the C pillar.

In this way, the upper member 18 and the lower member 20 are formed, respectively, into shapes which form substantially closed cross sections such as a U-shape cross section or a C-shape cross section as is shown in FIG. 7. In FIG. 7, the upper member 18 has a shape which opens inwards, while the lower member has a shape which opens outwards. These upper member 18 and lower member 20 are overlapped on each other in such a manner that they come out of alignment in the vertical direction. As this occurs, the upper member 18 and the lower member 20 are disposed so as to overlap each other in the horizontal direction with their open portions made to confront each other. In addition, since the C pillar 10 is made up by joining the lower end of the upper member 18, that is, the connecting plate 34 to the mounting plate 44 as is shown in FIG. 8, in the event that the C pillar is cut straight through along a substantially horizontal plane, the C pillar 10 always assumes in cross section the annular shape which defines a closed section or the U-shape or C-shape which is left partially open but which still defines a substantially closed cross section when cut along any cross section in any position therealong. FIG. 7 shows the cross-sectional shape which results when cut along a substantially horizontal plane which passes through the line denoted by F2 in FIGS. 4 and 5, and FIG. 8 shows a cross-sectional shape which results when cut along a vertical plane which passes through a line denoted by F3 in FIG. 5.

Namely, as is shown in FIG. 7, the upper member 18 and the lower member 20 overlap each other with their open cross sections made to confront each other between the top plate 36 and the mounting plate 44 of the C pillar 10 which, and as is shown in FIG. 8, in such a state that the upper member 18 and the lower member 20 are made to deviate from each other in the vertical direction, the flanges 33 and the flange 41 are joined together along the planes which extend vertically on both the sides of the mounting plate 44. Consequently, the C pillar 10 can secure sufficient rigidity also at the portion where the upper member 18 and the lower member 20 are joined together, whereby the C pillar 10 is allowed to have a construction which is strong and rigid as a whole and which has sufficient strength against force in any direction or torsion.

Figure 10:
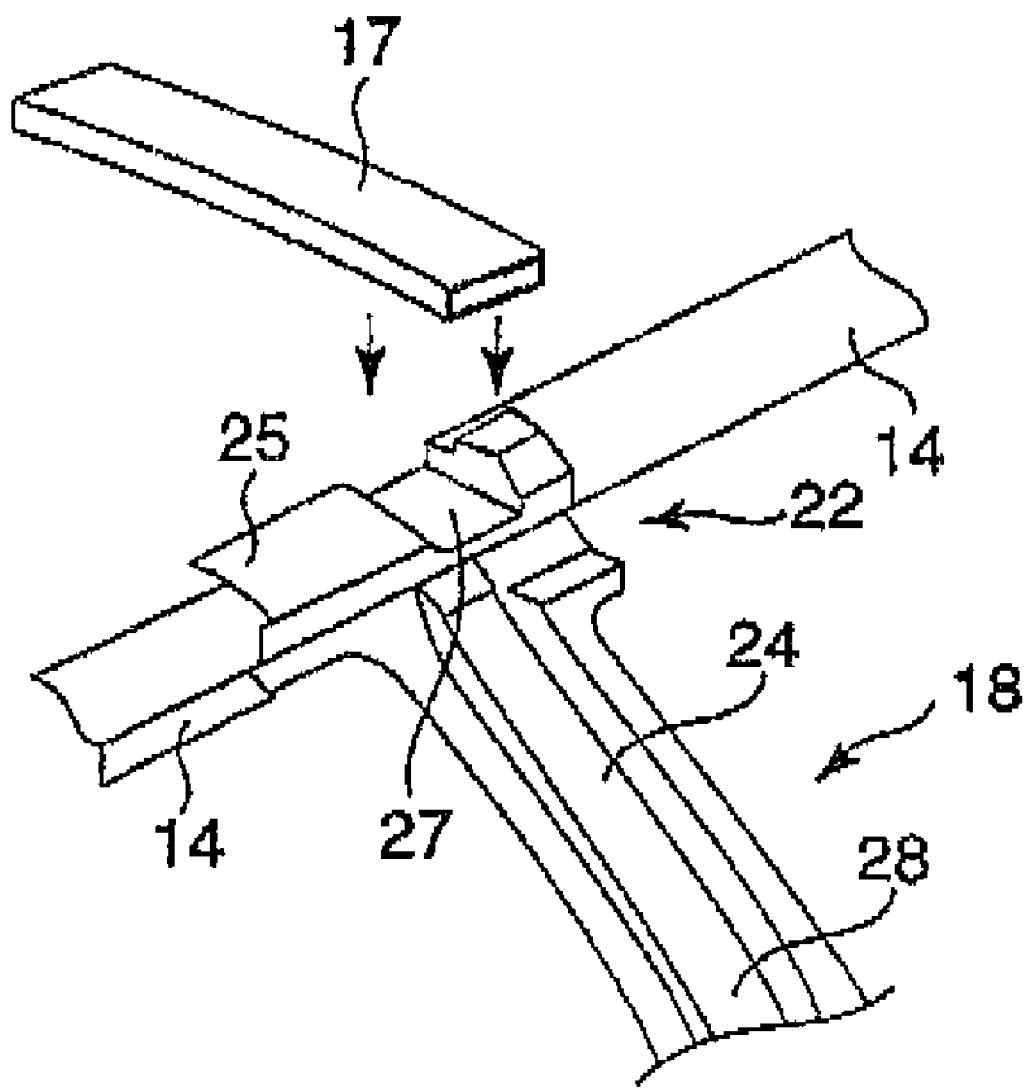
FIG. 10 is a perspective view showing an upper portion of the C pillar.

In addition, as is shown in FIG. 10, the upper end of the C pillar 10 is formed into a T shape, and as has been described before, the side roof rail 14 is connected to the upper end of the C pillar 10. In addition, as has been described before, the depression 27 is formed in the center of the upper end of the C pillar 10, and the roof bow 17, which is extended between the left and right si de roof rails 14, is fitted in the depression 27 for connection to the C pillar 10.

Figure 9:
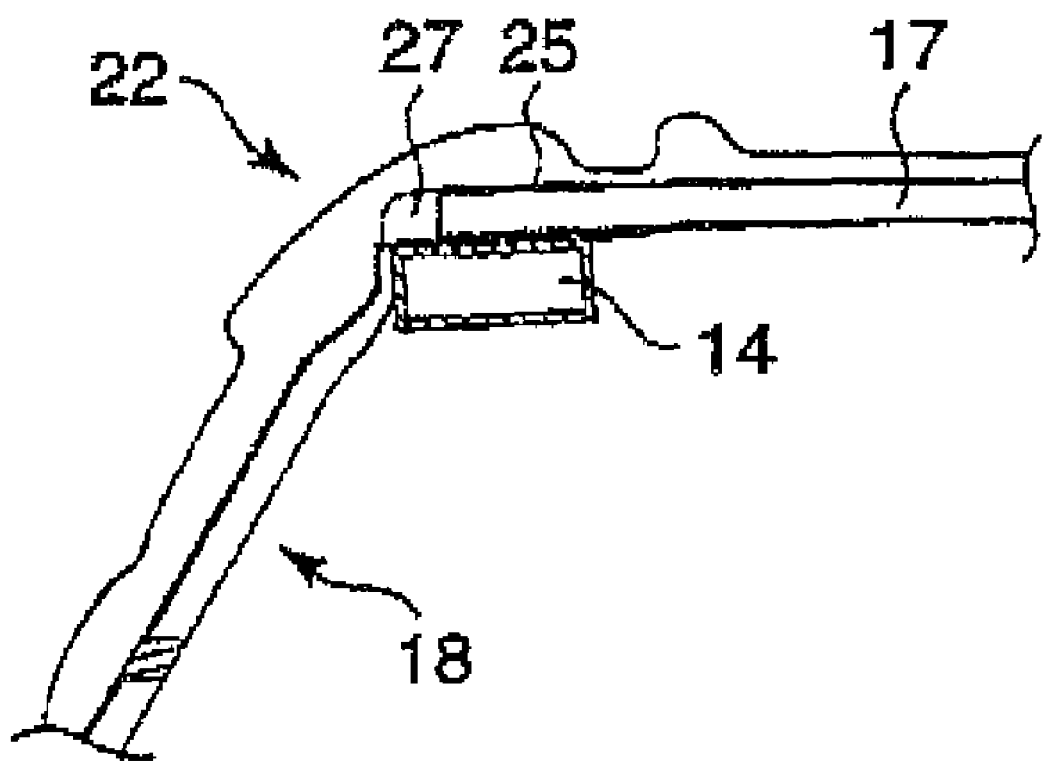
FIG. 9 is a sectional view showing the C pillar.

The roof bow 17 is an annular member of a quadrangular cross section which is extruded of, for example, aluminum, and is fixed into the depression 27 on the upper member 18 of the C pillar 10 while keeping the angularly annular cross section. The roof bow 17 is fixed into the depression on the upper member 18 by means of, for example, welding. FIG. 9 shows a cross section. By this configuration, on the vehicle, an outer shell portion of the vehicle can be configured continuously by the members of the substantially closed cross sections made up of thereof when it is made up of the pair of left and right C pillars and the roof bow 17 in the manner described above, thereby making it possible to realize the body construction having high rigidity. In addition, in the event that the rear cross-member 19 is made into a construction with a closed cross section, the outer shell surrounding construction of the vehicle which passes through the C pillars 10 can be made up of the members of the closed cross sections.

Furthermore, since the roof bow 17 is fixed to the C pillars 10 by means of welding in such a state that the roof bow 17 is received in the depressions 27, a longitudinal alignment of the roof bow 17 is facilitated, a space between the left and right side roof rails 14 can be formed accurately without being affected by the dimensional accuracy of the root bow 17.

The pillar according to an aspect of the invention has the following advantages.

Since the pillar is made up of the two vertical members such as the upper member and the lower member, the respective members are made smaller in size and can easily be formed through diecast. When cut along the horizontal plane, since the portion where the upper member and the lower member are joined together is formed into the substantially annular shape, the rigidity can be increased so as to deal with force from any direction. In addition, since the upper member and the lower member are overlapped on each other (overlapped in the horizontal direction) in the portion where the upper member and the lower member are joined together with the upper member and the lower member made to deviate from each other in the vertical direction, a tolerance for alignment with respect to the longitudinal direction of the pillar or the vertical direction of the vehicle becomes large, thereby making it possible to facilitate the joining of the upper and lower members.

Since the roof bow is fixed to the upper portion of the C pillar in such a state the roof bow keeps the annular cross section, the structural members which surround the circumference of the outer shell of the vehicle which is continuously made up by the left and right C pillars and the roof bow and furthermore, the rear cross member are made up of a member whose shape is close to the annular cross section. Consequently, the rigidity of the C pillars of the vehicle can be increased.

What is clamed is:

1. A pillar construction for a vehicle, comprising:
a pillar which is a part of a body of the vehicle, the pillar including an upper member and a lower member made of diecast aluminum alloy, wherein
the upper member has a substantially U-shaped cross section, and includes first side walls extending substantially in a transverse direction of the vehicle at least at a lower portion thereof, and the upper member further includes a connecting plate at a lower end thereof while keeping the U-shaped cross section,
the lower member includes a mounting plate, opposed to the connecting plate, at a lower portion thereof which is lower than an upper end thereof, and the lower member includes second side walls at both end portions of the mounting plate in a longitudinal direction of the vehicle, the second side walls extend substantially in the transverse direction of the vehicle the second side walls defining a substantially U-shaped cross section having an open portion facing outward of the vehicle, and
the connecting plate and the mounting plate are welded to each other in a state that the connecting plate and the mounting plate are in abutment with each other, and the first side walls and the second side walls or the first and second side walls and wall members attached to the first and second side walls, are joined to each other, such that the upper member and the lower member are integrally fixed to each other.

2. A pillar construction for a vehicle, comprising:
a pillar which is a part of a body of the vehicle, the pillar including an upper member and a lower member which are made of diecast aluminum alloy, wherein
the upper member has a substantially U-shaped cross section, and includes first side walls extending substantially in a transverse direction of the vehicle at least at a lower portion thereof, and the upper member further includes a connecting plate at a lower end thereof while keeping the U-shaped cross section,
the lower member includes a mounting plate, opposed to the connecting plate, at a lower portion thereof which is lower than an upper end thereof, and the lower member includes second side walls at both end portions of the mounting plate in a longitudinal direction of the vehicle, the second side walls extend substantially in the transverse direction of the vehicle,
the connecting plate and the mounting plate are welded to each other in a state that the connecting plate and the mounting plate are in abutment with each other, and the first side walls and the second side walls or the first and second side walls and wall members attached to the first and second side walls, are joined to each other, and the upper member, such that the lower member are integrally fixed to each other, and
the pillar includes a C pillar in which an upper end of the upper member is attached to a side roof rail and the lower portion of the lower member is attached to a side sill.

3. The pillar construction according to claim 2, wherein the upper end is provided with a depression, an end portion of a roof bow having an angularly annular cross section is fitted to the depression, and the end portion of the roof bow is fixed into the depression.

* * * * *